United States Patent
Chiba et al.

(10) Patent No.: US 8,130,267 B2
(45) Date of Patent: Mar. 6, 2012

(54) DATA INPUT DEVICE, DATA INPUT SYSTEM, DATA INPUT METHOD, PRINTING DEVICE, AND PRINTED MATTER

(75) Inventors: Hirotaka Chiba, Kawasaki (JP); Tsugio Noda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1280 days.

(21) Appl. No.: 11/738,180

(22) Filed: Apr. 20, 2007

(65) Prior Publication Data
US 2008/0055655 A1 Mar. 6, 2008

(30) Foreign Application Priority Data
Aug. 31, 2006 (JP) .................. 2006-236789

(51) Int. Cl.
*H04N 7/18* (2006.01)
*G06F 15/16* (2006.01)

(52) U.S. Cl. ........................................ 348/116
(58) Field of Classification Search ........... 348/114–118
See application file for complete search history.

(56) References Cited

U.S. PATENT DOCUMENTS

| | | | |
|---|---|---|---|
| 6,604,045 B2 | 8/2003 | Kuroda et al. | |
| 7,140,543 B2* | 11/2006 | Giordano et al. | 235/454 |
| 7,188,307 B2* | 3/2007 | Ohsawa | 715/205 |
| 2001/0037163 A1* | 11/2001 | Allard | 700/245 |
| 2002/0147910 A1 | 10/2002 | Brundage et al. | |
| 2004/0234139 A1 | 11/2004 | Moroo et al. | |
| 2005/0213790 A1 | 9/2005 | Rhoads et al. | |
| 2005/0240344 A1* | 10/2005 | Tomita et al. | 701/211 |
| 2006/0122995 A1* | 6/2006 | Shimizu et al. | 707/4 |

FOREIGN PATENT DOCUMENTS

| | | |
|---|---|---|
| JP | 2002-22473 | 1/2002 |
| JP | 2002-048586 | 2/2002 |
| JP | 2002-303524 | 10/2002 |
| JP | 2003-161627 | 6/2003 |
| JP | 2003-177027 | 6/2003 |
| JP | 2004-157942 | 6/2004 |
| JP | 2004-333383 | 11/2004 |
| JP | 2004-349879 | 12/2004 |
| JP | 2005-100276 | 4/2005 |
| JP | 2005-100277 | 4/2005 |
| JP | 2005-265591 | 9/2005 |
| JP | 2005-339101 | 12/2005 |
| JP | 2006-184108 | 7/2006 |

OTHER PUBLICATIONS

Noda et al., "Print-type Steganography Technology" Fujitsu Japan, vol. 57, No. 3, May. 2006, pp. 320-324.
Extended European Search Report issued in corresponding European Patent Application No. 07106710.2, on Jan. 10, 2008.
Japanese Office Action issued on Aug. 9, 2011 in corresponding Japanese Patent Application 2006-236789.

* cited by examiner

*Primary Examiner* — Zarni Maung
(74) *Attorney, Agent, or Firm* — Staas & Halsey LLP (57) ABSTRACT

A data input device which inputs data to a navigation device includes: an image input unit capturing an image displayed on an image display carrier for displaying an image; a code extraction unit extracting a code hidden in the image; and a transmission unit transmitting the code to the navigation device.

10 Claims, 11 Drawing Sheets

DATA INPUT DEVICE, DATA INPUT SYSTEM, DATA INPUT METHOD, PRINTING DEVICE, AND PRINTED MATTER

CROSS REFERENCE TO RELATED APPLICATIONS

The present application is based on Japanese Priority Patent Application No. 2006-236789, filed on Aug. 31, 2006, the entire contents of which are hereby incorporated herein by reference.

BACKGROUND OF THE INVENTION

1. Field of the Invention

The present invention relates to a data input device and a data input system for inputting position data of a destination, a way point, etc. to a navigation device, and a target printed matter for the data input device.

2. Description of the Related Art

Conventionally, as a method of inputting data to a navigation device, position data (a telephone number, a map code (registered trademark), etc.) formed by numbers indicating a destination, a way point, etc. is stored in the memory of a mobile telephone, and transferred and set when the mobile phone is connected to the navigation device (for example, the patent document 1).

A method of expressing numeric and alphabetic characters can be a method using a 2-dimensional code (QR code, PDF417, etc.).

However, there have been the problems with the 2-dimensional codes that a space is required to display them on, the codes are obstacles in the sense of design, etc.

Then, as a technique for solving these problems, there is steganography for hiding additional data in image data, audio data, etc. One technique of the steganography of to hide a code in an image using the difference between the average densities of adjacent blocks. The image in which the code is hidden by the code hiding technique is output to paper, a display device, etc., input to the input device of a camera and the like, and is used in performing a decoding process. In the decoding process, coded data is decoded into the original data on the basis of the difference in average densities between adjacent blocks of the input image (for example, the patent document 2)

[Patent Document 1] Japanese Published Patent Application No. 2002-22473]

[Patent Document 2] Japanese Published Patent Application No. 2004-349879]

However, the position data described in a guide book and the like for input to the conventional navigation device is simply a sequence of numerics having no meanings at all, and possibly causes the problems that input errors can be made when position data such as a destination, a way point, etc. is transferred, and a user feels poor operability.

SUMMARY OF THE INVENTION

The present invention aims at providing a convenient data input device and system without input errors.

According to an aspect of the present invention, the data input device of the present invention inputs data to a navigation device, and includes: an image input unit for capturing an image displayed on an image display carrier for displaying an image; a code extraction unit for extracting a code hidden in the image; and a transmission unit for transmitting the code to the navigation device.

It is desired that the data input device according to the present invention further includes an ID inquiry device for transmitting the extracted code to the ID management server, and receiving a position data corresponding to the code, and the transmission device transmits the received position data to the navigation device.

The ID inquiry unit of the data input device according to the present invention further receives the URL of a contents server corresponding to the code, and accesses the contents server of the URL. The data input device according to the present invention further includes a contents information read unit for receiving contents information from the contents server, and the transmission unit can transmit the contents information to the navigation device.

According to an aspect of the present invention, the data input system of the present invention includes a data input device for inputting data to a navigation device having: an image input unit for capturing an image displayed on an image display carrier for displaying an image; a code extraction unit for extracting a code hidden in the image; an ID inquiry unit for transmitting the extracted code to the ID management server and receiving position data corresponding to the code; and a transmission unit for transmitting the received position data to the navigation device, and an ID management server storing the position data corresponding to the code, receiving the code from the transmission unit of the data input device, and transmitting the position data corresponding to the code to the data input device.

According to an aspect of the present invention, the data input system of the present invention includes a data input device for inputting data to a navigation device having: an image input unit for capturing an image displayed on an image display carrier for displaying an image; a code extraction unit for extracting a code hidden in the image; an ID inquiry unit for transmitting the extracted code to the ID management server and receiving position data corresponding to the code and the URL of a contents server; a contents information read unit for accessing the contents server of the URL and receiving contents information from the contents server; and a transmission unit for transmitting the received contents information to the navigation device, and an ID management server storing the position data and the URL corresponding to the code, receiving the code from the transmission unit of the data input device, and transmitting the position data and the URL corresponding to the code to the data input device.

It is desired that, in the data input system according to the present invention, the navigation device displays the contents information on the display unit of its own device.

It is desired that the data input device according to the present invention holds the previously transmitted code and the position data corresponding to the code as history information, checks whether or not the code is stored in the history information when the extracted code is transmitted to the ID management server, transmits the position data corresponding to the code to the navigation device if the code is stored, and transmits the code to the ID management server when the code is not stored.

It is desired that, in the data input device according to the present invention, the code is hidden in an image by the steganography.

The data input device according to the present invention can have the image display carrier as a printed matter.

According to an aspect of the present invention, the printing device according of the present invention prints an image captured by the image input unit of the data input device, and includes a code hiding unit for hiding a code in an image, a printing unit for printing an image in which a code is hidden by the code hiding unit, and an ID management server storing the hidden code and the position data associated with the hidden code.

According to an aspect of the present invention, a printed matter of the present invention is printed on the printing unit.

According to the present invention, input errors can be avoided when the information about a destination and the like is input to the navigation device, thereby easily inputting the information.

In addition, the Web information relating to a destination can be displayed on the display device of the navigation device.

DESCRIPTION OF THE PREFERRED EMBODIMENTS

The embodiment of the present invention is explained below by referring to the attached drawings.

First, the encoding process performed by the technique of hiding a code in a pair of adjacent blocks using the difference in average density between the adjacent blocks indicating no degradation of image quality is explained.

Figure 1:
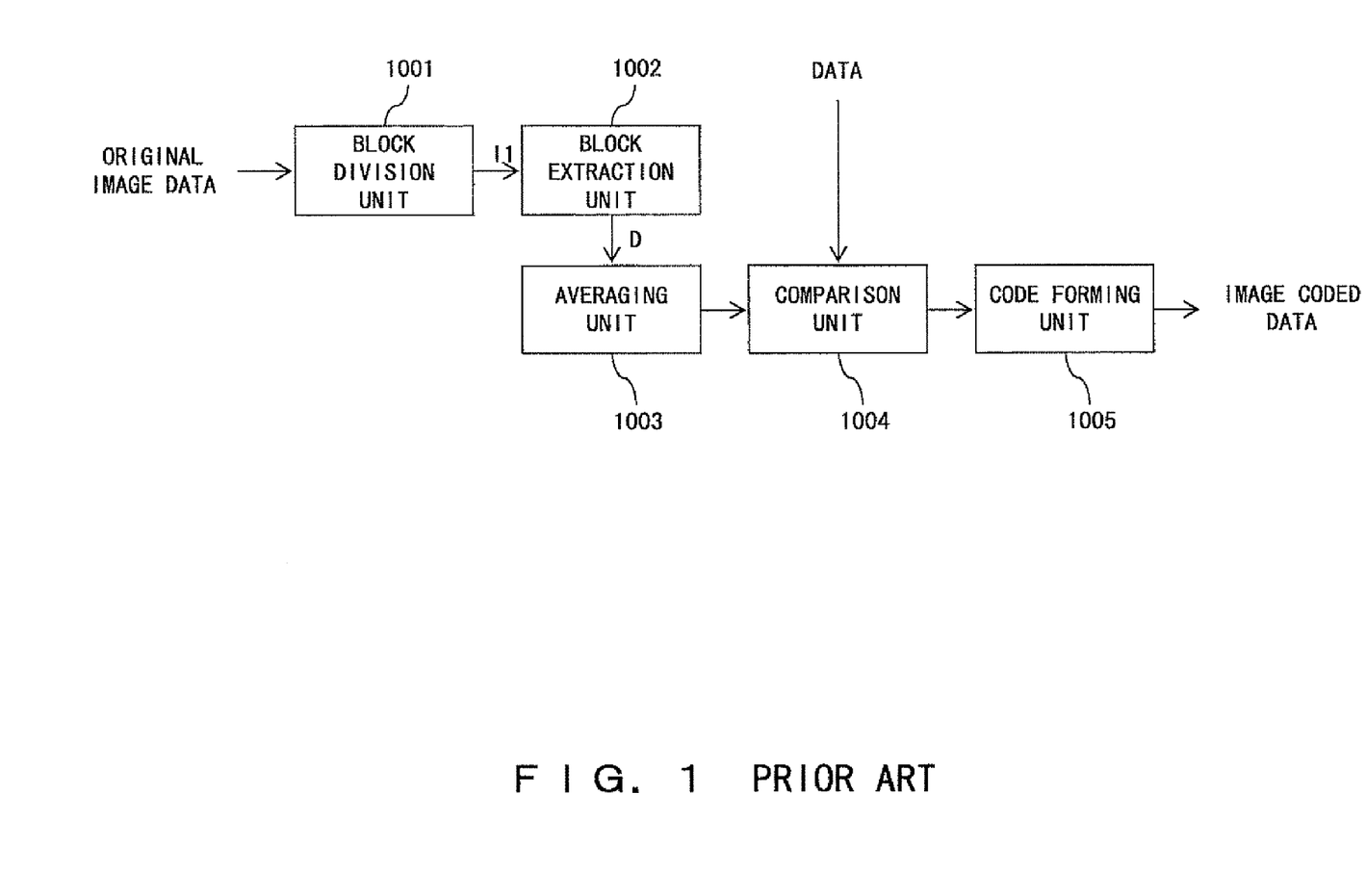
FIG. 1 is a block diagram of the encoder for hiding a code in an image.

FIG. 1 is a block diagram of the encoder for hiding a code in an image.

Figure 2:
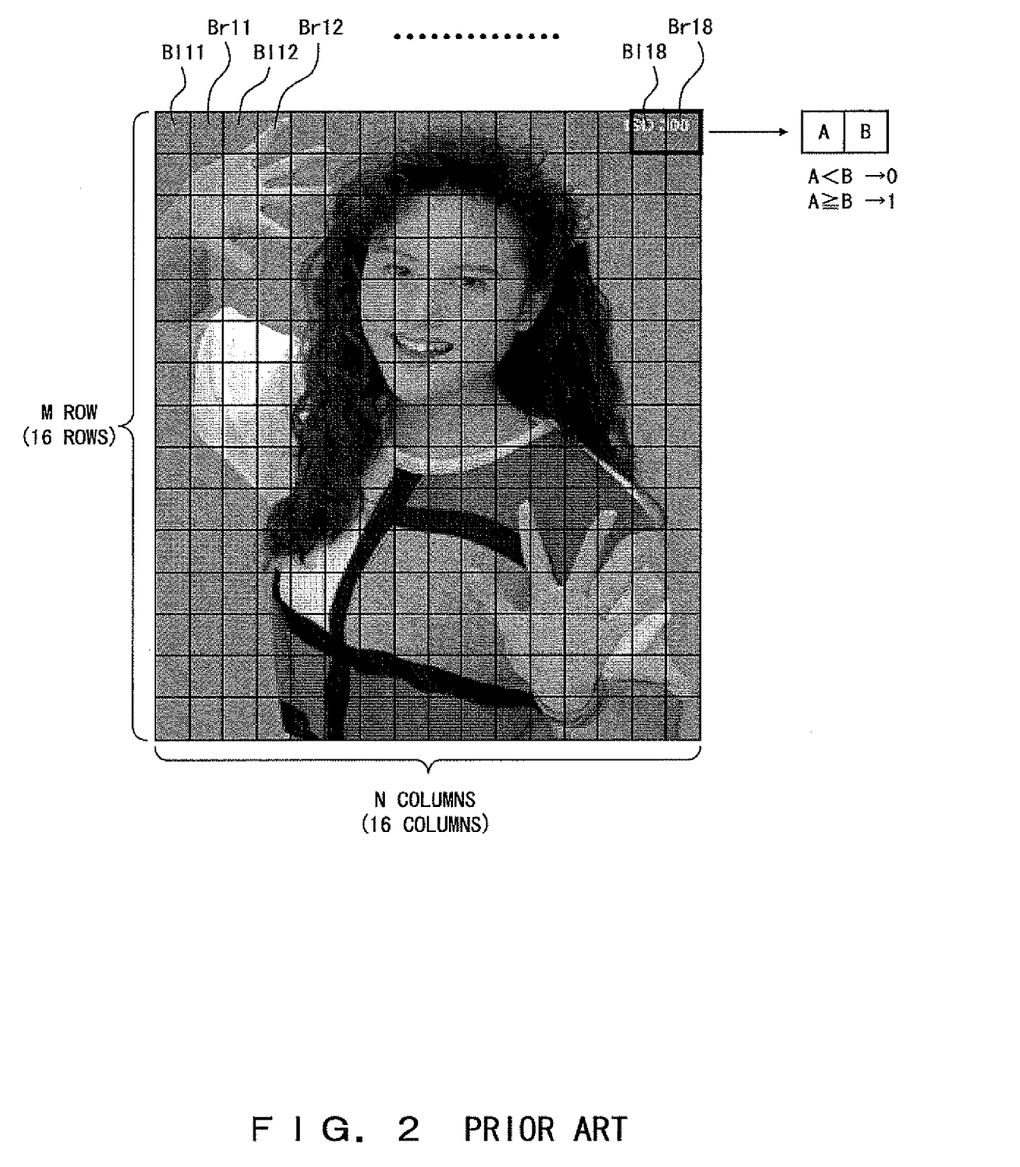
FIG. 2 shows an example of an image in which a code is hidden.

FIG. 2 shows an example of an image in which a code is hidden.

The encoder is a device for hiding a code C in the original image data, for example, eight times, and generating image coded data.

The original image data is image data generated in a predetermined format (JPEG (Joint Photographic Experts Group) GIF (Graphics Interchange Format), etc.), and in size of 1024×1024 pixels. In this original image data, for example, a code C having a 16-bit configuration (1010110101001010) is hidden.

In the encoder, a block division unit 1001 divides the input original image data into blocks of M rows×N columns (16×16 in FIG. 2) as shown in FIG. 2, and outputs the result as a block division image data I1.

The block division image data is configured by 256 (16× 16) blocks of blocks Bl11, Br11, . . . , Bl18, Br18, Bl21, Br21, . . . , and Bl168, Br168. One block is formed in size of 64×64 pixels.

In the block division image data, one bit code is hidden in a pair of blocks (two adjacent blocks).

Practically, a pair of blocks are configured by pairs of blocks, that is, a block Bl11 and a block Br11, a block Bl12 and a block Br12, . . . , block Bl18 and a block Br18 (first row up to these blocks), . . . , a block Bl21 and a block Br21, . . . , a block Bl28 and a block Br28 (second row up to these blocks), . . . , a block Bl161 and a block Br161, . . . , and a block Bl168 and a block Br168 (sixteenth row up to these blocks).

In the blocks Blxy of the pairs of blocks, the subscript l indicate a left block in a pair of blocks, the subscript x indicates a row (M), and the subscript y indicates a column (N). On the other hand, in the blocks Brxy of the pairs of blocks, the subscript r indicate a right block in a pair of blocks, the subscript x indicates a row (M), and the subscript y indicates a column (N).

In the pairs of blocks, the average density (average gray scale of each pixel in a block) as an amount of features in a left block Blxy is defined as left average density data Dl, and the average density (amount of features) in a right block Brxy is defined as right average density data Dr.

As shown in the following relational expressions, when the left average density data Dl is lower than the right average density data Dr, the pair of blocks indicate "0" as a 1-bit code. On the other hand, when the left average density data Dl is equal to or higher than the right average density data Dr, the pair of blocks indicate "1" as a 1-bit code.

$Dl < Dr \rightarrow "0"$ $Dl \geq Dr \rightarrow "1"$

For example, in a pair of blocks of block Bl17 and block Br17, when the left average density data Dl17 indicates "115" and the right average density data Dr17 indicates "125", the 1-bit code indicates "0".

In a pair of blocks of block Bl18 and block Br18, when the left average density data Dl18 indicates "125" and the right average density data Dr18 indicates "115", the 1-bit code indicates "1".

In the block division image data, one row includes 8 pairs of blocks (16 blocks). Therefore, 8-bit codes are expressed. Accordingly, in the entire rows (16 rows), 128-bit codes are expressed. In the explanation of this specification, since the code C hidden in the block division image data is 16 bits, the code C can be hidden in the block division image data I1 a maximum of 8 (128/16) times.

A block extraction unit 1002 sequentially extracts pairs of blocks (blocks Blxy and blocks Brxy) from the block division image data in accordance with the bit shift of the code C, and outputs the density distribution in each of the block Blxy and the block Brxy as a block density data D.

The bit shift of the code C refers to one bit shift of a bit pointer to right from the leftmost bit (1) to right bits (0).

An averaging unit 1003 obtains the left average density data Dl corresponding to the block Blxy and the right average density data Dr corresponding to the block Brxy from the block density data D.

A comparison unit 1004 compares the n-th bit (n=1, 2, . . . , 16 from the leftmost bit of the code C described above) of the code C with the bit determination result (each bit is determined as "0" or "1" by the above-mentioned relational expression) determined from the size relationship between the left average density data Dl and the right average density data Dr.

A code forming unit 1005 performs the process of hiding the code C in the block division image data (original image data) on the basis of the comparison result of the comparison unit 1004. Practically, the code forming unit 1005 maintains the size relationship between the left average density data Dl and the right average density data Dr when the comparison unit 1004 outputs a matching result. When a non-matching result is output, the left average density data Dl and the right average density data Dr is changed (the size relationship is inverted) such that the size relationship can indicate the bit of the code C, and the image coded data is generated and output.

Figure 3:
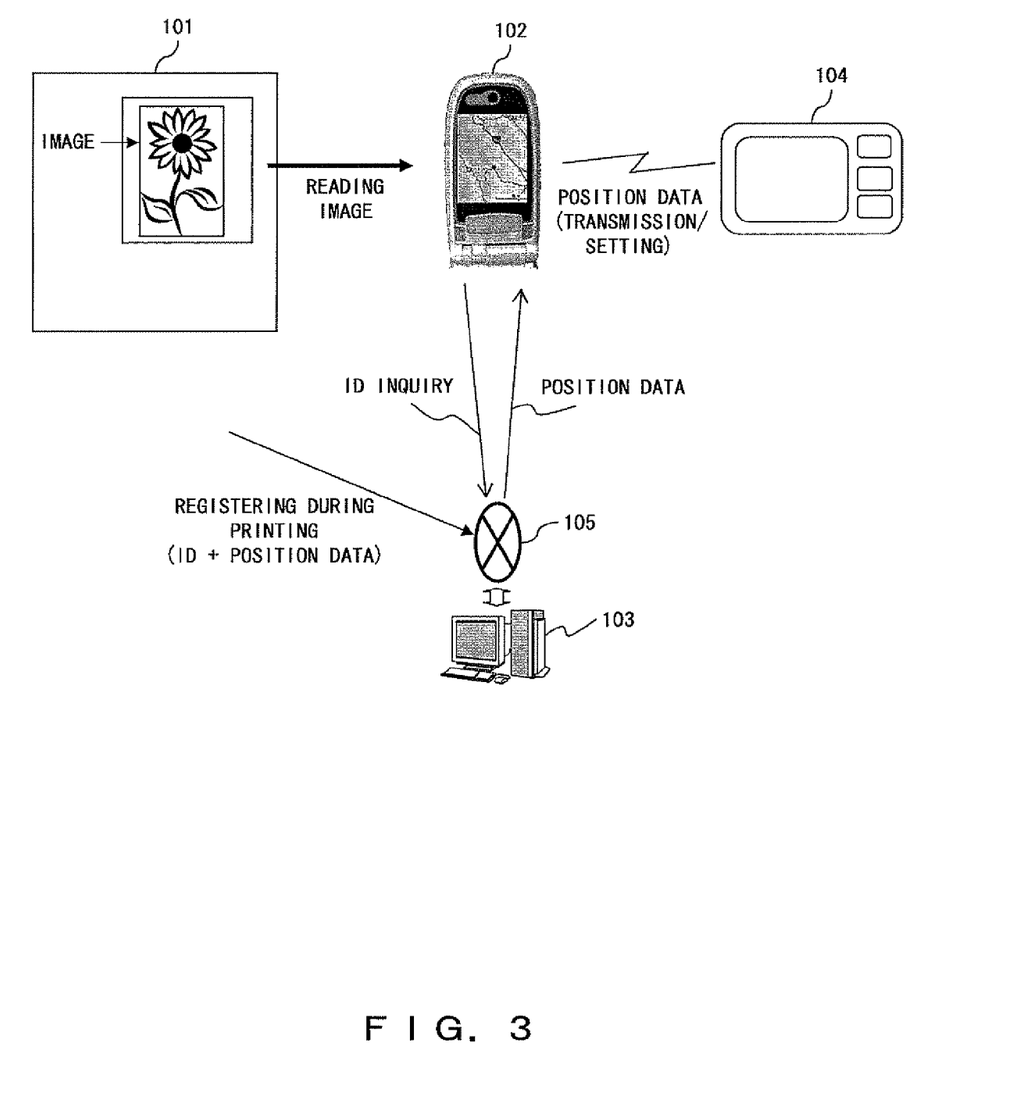
FIG. 3 shows the configuration of the data input system according to the first embodiment of the present invention.

FIG. 3 shows the configuration of the data input system according to the first embodiment of the present invention.

A printed matter 101 is used as an image display carrier displaying an image, and the image is printed on the printed matter 101. The image hides a code by the code hiding technique.

A data input device 102 has an image input unit for capturing an image, captures the image of the printed matter 101, extracts the hidden code, issues to an ID management server 103 connected through a network 105 an inquiry about position data corresponding to the code, and transmits the position data received from the ID management server 103 to a navigation device 104. The data input device can be a mobile phone, a PHS (personal handyphone system), a PDA (personal digital assistants), etc.

An image display carrier can be paper, plastic, electronic paper, a liquid crystal display, etc., and an image is displayed on a printer or electronically, and captured by an image input unit.

The ID management server 103 stores position data corresponding to an ID using a code hidden in the printed matter 101, and transmits the position data corresponding to the ID to the data input device at a request of the data input device. The position data can be, in addition to specific numeral information such as a telephone number, a map code, etc., the position data indicating the latitude and the longitude (for example, lat. 35° 39" 5' 6 N and long. 139° 44" 4" 7 E is expressed by N35.39.05.60, E139.44.04.7), an address (character data), etc. that can be input to the navigation device and selected on the basis of the position data input to the navigation device.

The navigation device 104 sets a destination on the basis of the input position data, and searches for a path.

Figure 4:
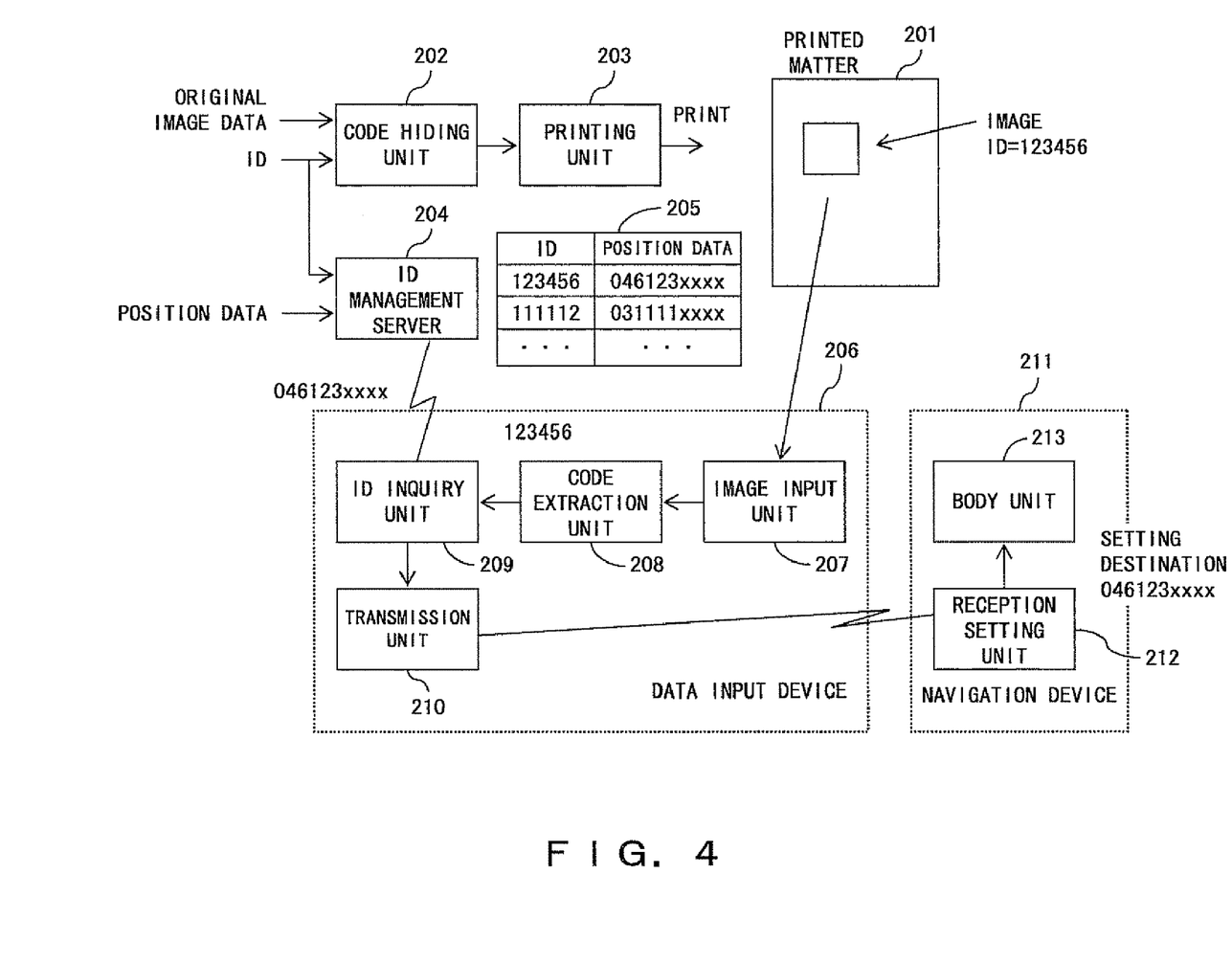
FIG. 4 is a block diagram of the data input system according to the first embodiment of the present invention.

FIG. 4 is a block diagram of the data input system according to the first embodiment of the present invention.

Figure 5:
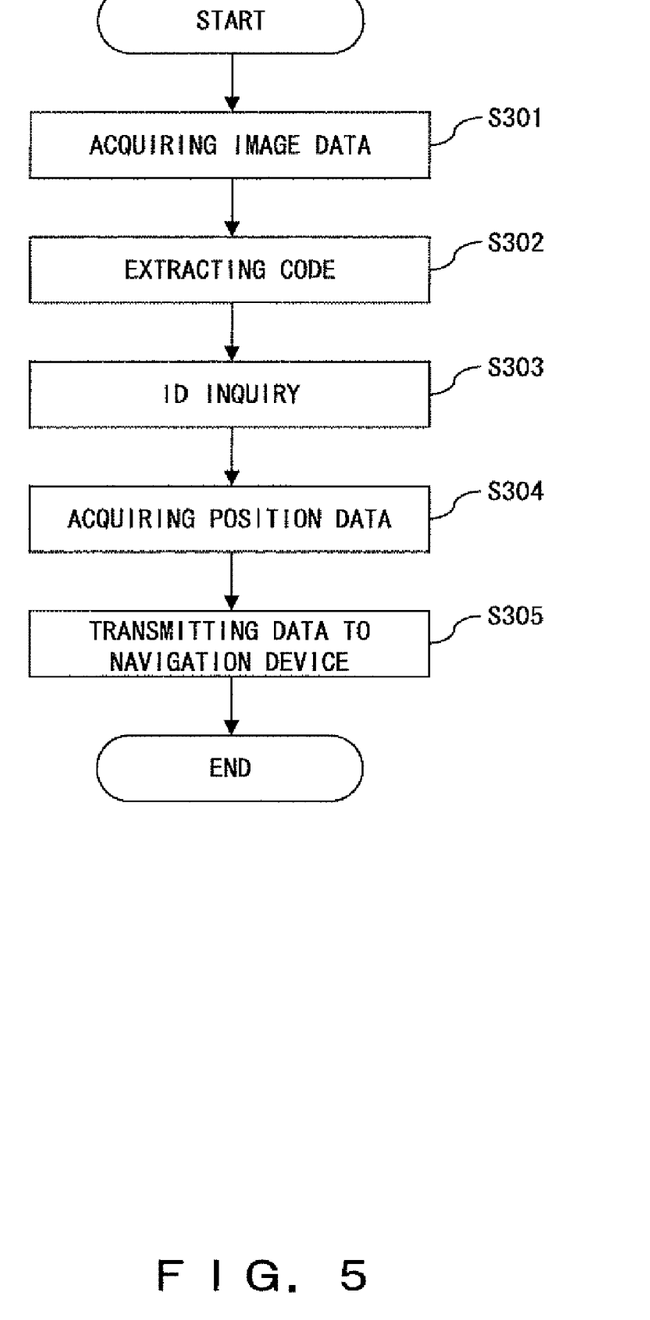
FIG. 5 is a flowchart of the process of inputting data according to the first embodiment of the present invention.

FIG. 5 is a flowchart of the process of inputting data according to the first embodiment of the present invention.

First, a method for making a printed matter 201 used in the first embodiment of the present invention is explained below.

An ID is input to a code hiding unit 202 as a code to be hidden in an image together with the original image data. For example, 123456 is input as an ID. The ID can be any combination of numerics and characters. The code hiding unit 202 can be, for example, an encoder shown in FIG. 1, and outputs to a printing unit 203 the encoded image data with an ID hidden using the above-mentioned code hiding technique.

The printing unit 203 prints the received image data. The printing unit 203 prints received image data. The printing unit 203 can be, in addition to a rotary press and a laser printer for printing on paper, an overwrite device for overwriting data on electronic paper, etc.

Thus, the printed matter 201 is prepared with the image printed with 123456 hidden as an ID. As a printed matter, paper, plastic, electronic paper, etc. are used.

To an ID management server 204, the ID input to the code hiding unit 202 and the position data corresponding to the ID are input. For example, 123456 is input as an ID, and 046123xxxx is input as position data. The ID management server 204 stores in an ID management table 205 the ID and the position data associated with the ID.

When a printed matter is generated, a printing device provided with the code hiding unit 202, the printing unit 203, and the ID management server 204, and a printing system in which each component is connected over a network are used.

A data input device 206 is provided with an image input unit 207, a code extraction unit 208, an ID inquiry unit 209, and a transmission unit 210.

Described below is the process of inputting data according to the first embodiment of the present invention.

In step S301, the image input unit 207 such as a CCD camera, etc. captures an image of the printed matter 201, and stores the image data.

In step S302, the code extraction unit 208 extracts a code hidden in the stored image data. Then, 123456 is extracted as a code. The type of the code is determined whether or not the code is, for example, an ID, position data, etc. The method of determining the code is, for example, checking the most significant bit of the code.

In step S303, when the extracted code is an ID, the ID inquiry unit 209 transmits the extracted ID to the ID management server 204, and inquires about the position data corresponding to the ID. Upon receipt of the ID, the ID management server 204 retrieves the ID management table 205, reads the position data corresponding to the ID, and transmits the data to the data input device 206. In the embodiment of the present invention, for example, 123456 is transmitted from the data input device 206, and 046123xxxx corresponding to 123456 is detected as the position data by the ID management server 204, and transmitted to the data input device 206. The data input device holds the previously transmitted ID and the position data corresponding to the ID as history information, and the ID inquiry unit 209 checks whether or not the ID is stored in the history information when the extracted ID is transmitted to the ID management server, transmits the position data corresponding to the code to the navigation device if it is stored, and transmits the code to the ID management server if it is not stored.

In step S304, the ID inquiry unit 209 receives the position data and stores the position data.

In step S305, the transmission unit 210 transmits the stored position data to a navigation device 211. The data transmission from the data input device 206 to the navigation device 211 is performed by direct connection using a cable or by using an infrared radiation, radio waves, etc. Upon receipt of the position data, a reception setting unit 212 of the navigation device 211 transmits the data to a body unit 213, and sets the position data as, for example, a destination.

In the embodiment of the present invention, information is transmitted from the data input device to the navigation device through the transmission unit, but the data input device can be replaced with, or supplemented by a read/write unit to a portable recording medium such as a flash memory, etc., writes the position data to the portable recording medium, and sets it in the navigation device so that the position data can be transmitted. The same processes can be performed in other embodiment of the present invention.

Thus, an image is read by the data input device, a code hidden in the image is extracted, the position data corresponding to the ID is acquired if the code is an ID, it is transmitted to the navigation device, and the navigation device is set, thereby obtaining the effect that data can be obtained conveniently without input errors.

Although there are restrictions on the amount of information to be hidden in, for example, a small image, the position data of a large amount of information can be obtained by hiding an ID of a small amount of information and inquiring about the position data corresponding to the ID.

Figure 6:
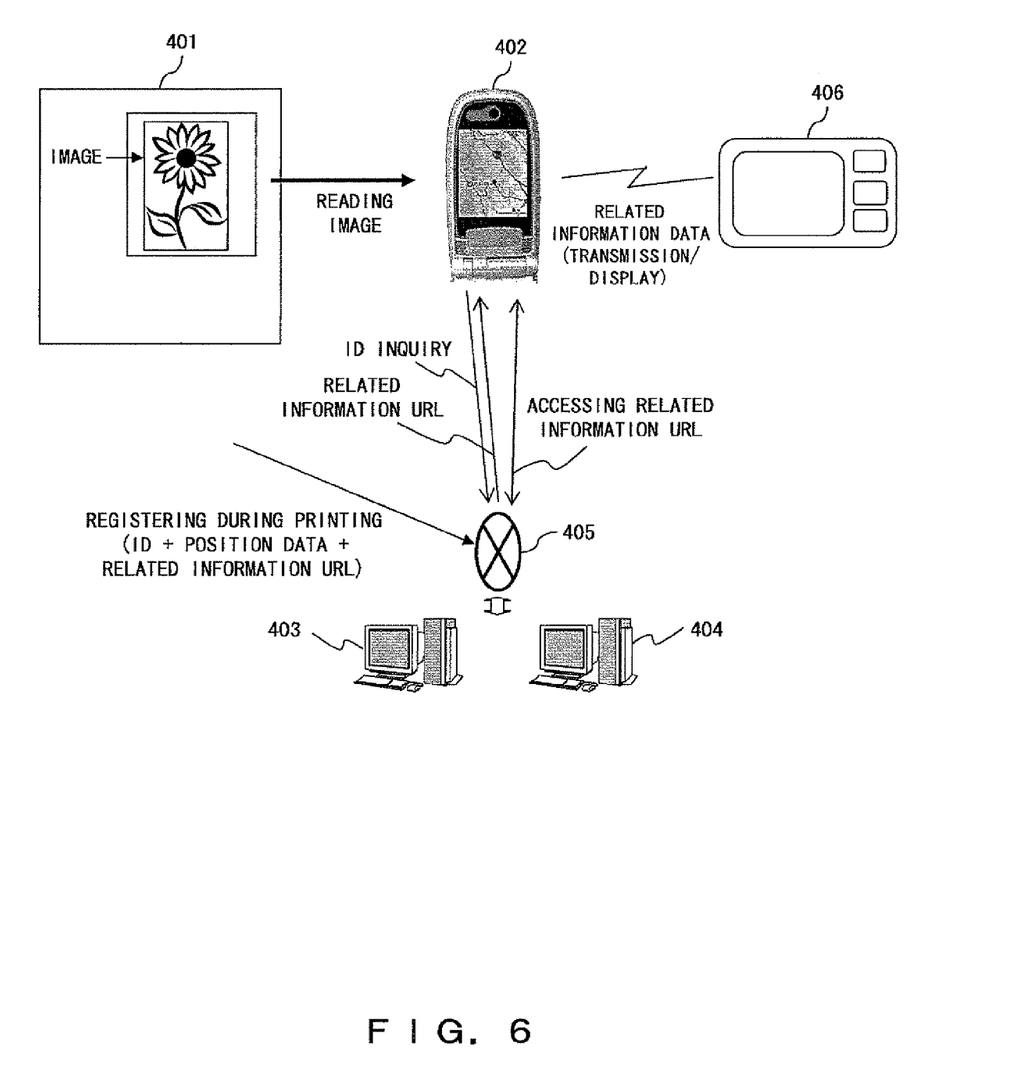
FIG. 6 shows the configuration of the data input system according to the second embodiment of the present invention.

FIG. 6 shows the configuration of the data input system according to the second embodiment of the present invention.

An image is printed to a printed matter 401, and the image hides an ID as a code by the above-mentioned code hiding technique.

A data input device 402 is provided with an image input unit for capturing an image, captures an image of the printed matter 401, extracts a hidden code, issues to an ID management server 403 connected through a network 405 an inquiry about the position data corresponding to the ID and the URL of the server (contents server) having relevant information if the code is an ID, and receives the position data and the URL from the ID management server 403. The data input device 402 accesses a contents server 404 connected over the network 405 on the basis of the received URL, and receives the contents information therein (for example, an HTML file (hypertext markup language), an image, text, etc.). Then, the data input device 402 transmits the position data and the contents information to the navigation device.

The ID management server 403 stores a code hidden in the printed matter 401 as an ID, the position data and the URL of the server associated with the ID and including the relevant information, and transmits the position data and the URL corresponding to the ID to the data input device 402 at a request to the data input device 402, and transmits the position data corresponding to the ID and the URL to the data input device 402.

The contents server 404 transmits the contents information stored in the contents server to the data input device at a request of the data input device.

A navigation device 406 sets destination and searches for a path on the basis of the input position data, and displays the input contents information.

Figure 7:
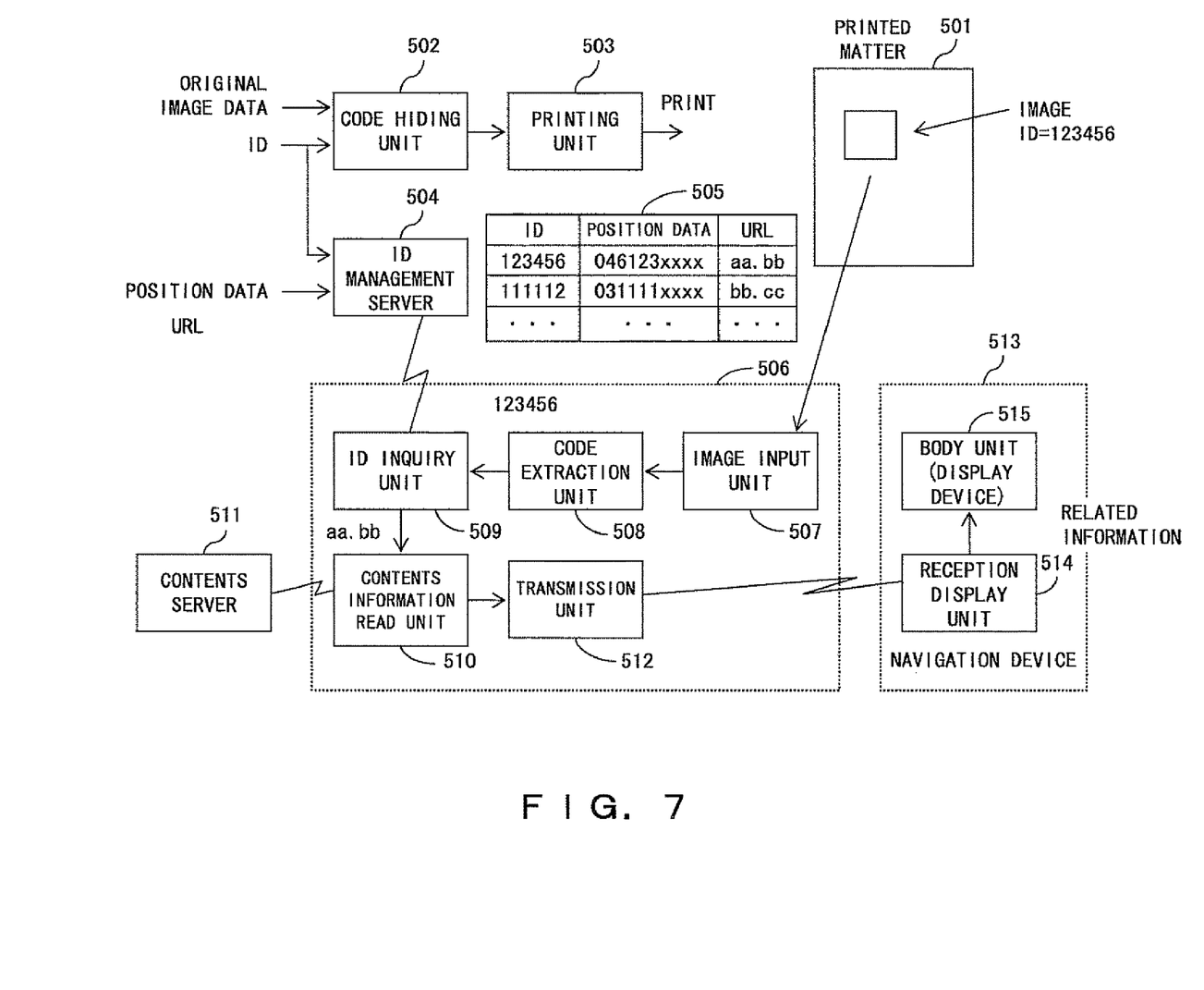
FIG. 7 is a block diagram of the data input system according to the second embodiment of the present invention.

FIG. 7 is a block diagram of the data input system according to the second embodiment of the present invention.

Figure 8:
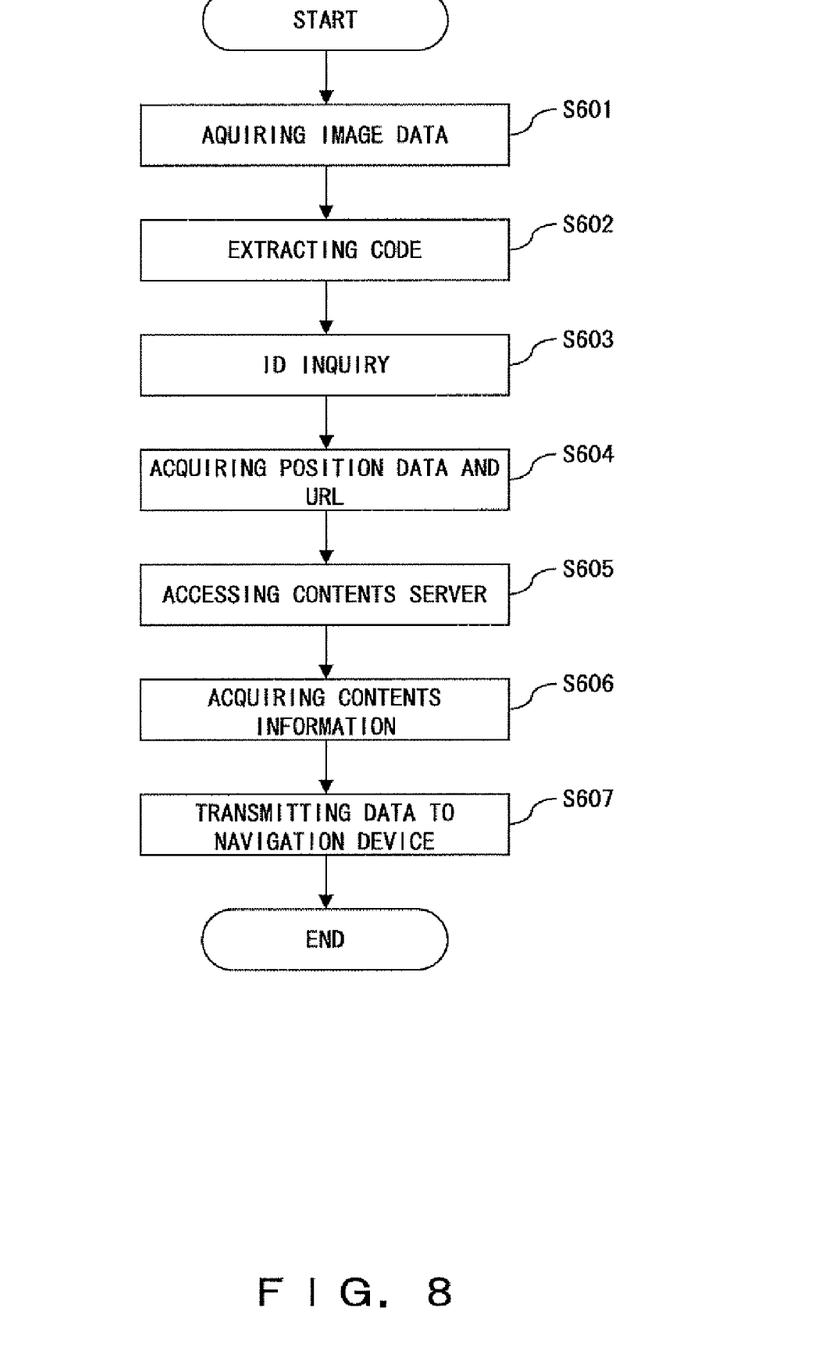
FIG. 8 is a flowchart of the process of inputting data according to the second embodiment of the present invention.

FIG. 8 is a flowchart of the process of inputting data according to the second embodiment of the present invention.

A printed matter 501 used in the second embodiment of the present invention is generated as in the first embodiment of the present invention. Therefore, the detailed explanation is omitted here. An ID is hidden as a code in an image of the printed matter 501, and the ID is 123456.

An ID management server 504 receives an ID input to a code hiding unit 502, the position data corresponding to the ID, and the URL corresponding to the ID. For example, 123456 is input as an ID, 046123xxxx is input as position data, and aa.bb is input as a URL. The ID management server 204 associates and stores the ID, the position data, and the URL in the ID management table 205.

A data input device 506 is provided with an image input unit 507, an code extraction unit 508, an ID inquiry unit 509, a contents information read unit 510, and a transmission unit 512.

A contents server 511 can be, for example, a Web server, and stores an HTML file and image data as contents information.

Described below is the process of inputting data according to the second embodiment of the present invention.

In step S601, an image input unit such as a CCD camera, etc. captures an image of the printed matter 501, and stores the image data.

In step S602, the code extraction device 508 extracts a code hidden in the stored image data. Then, 123456 is extracted as a code, and it is determined whether the type of is, for example, an ID, position data, etc.

In step S603, if the extracted code is ID, the ID inquiry unit 509 transmits the extracted ID to the ID management server 504, and inquires about the position data and the URL corresponding to the ID. Upon receipt of the ID, the ID management server 504 searches an ID management table 505, reads the position data and the URL corresponding to the ID, and transmits them to the data input device 506. In the embodiment of the present invention, for example, 123456 is transmitted as an ID from the data input device 506, 046123xxxx corresponding the ID is detected as a position data, aa.bb corresponding the ID is detected as a URL by the ID management server 504, and the data is transmitted to the data input device 506.

In step S604, the ID inquiry device 509 receives the position data and the URL, and stores the position data and the URL.

In step S605, the contents information read unit 510 accesses the contents server of the received URL.

In step S606, the contents server 511 transmits the contents information in the contents server 511 to the data input device 506 at a request of the data input device 506. The contents information read unit 510 stores the received contents information.

In step S607, the transmission unit 512 transmits the stored position data and contents information to a navigation device 513. Upon receipt of the position data, a reception display unit 514 of the navigation device 513 transmits the data to a body unit 515, and sets the position data as, for example, a destination. Upon receipt of the contents information, the reception display unit 514 displays the contents information on the display device of the body unit 515.

Thus, the data input device reads an image, a code hidden in the image is extracted, the position data corresponding to the ID is acquired if the code is an ID, the data is transmitted to the navigation device, and the navigation device is set, thereby obtaining the effect of the convenient device without input errors.

Although there are restrictions on the amount of information to be hidden in, for example, a small image, the position data and a URL of a large amount of information can be obtained by hiding an ID of a small amount of information and inquiring about the position data and the URL corresponding to the ID.

Normally, since the display unit of the data input device is small while the display unit of a navigation device is large, contents information can be obtained and displayed on the navigation device, thereby allowing the information to be easily seen.

According to the first and second embodiment of the present invention, the ID management server manages the position data. It is necessary that the data input device can perform communications to issue an inquiry to the ID management server. According to the third embodiment of the present invention, it is not necessary to perform communications with the ID management server by hiding the position data in an image.

Figure 9:
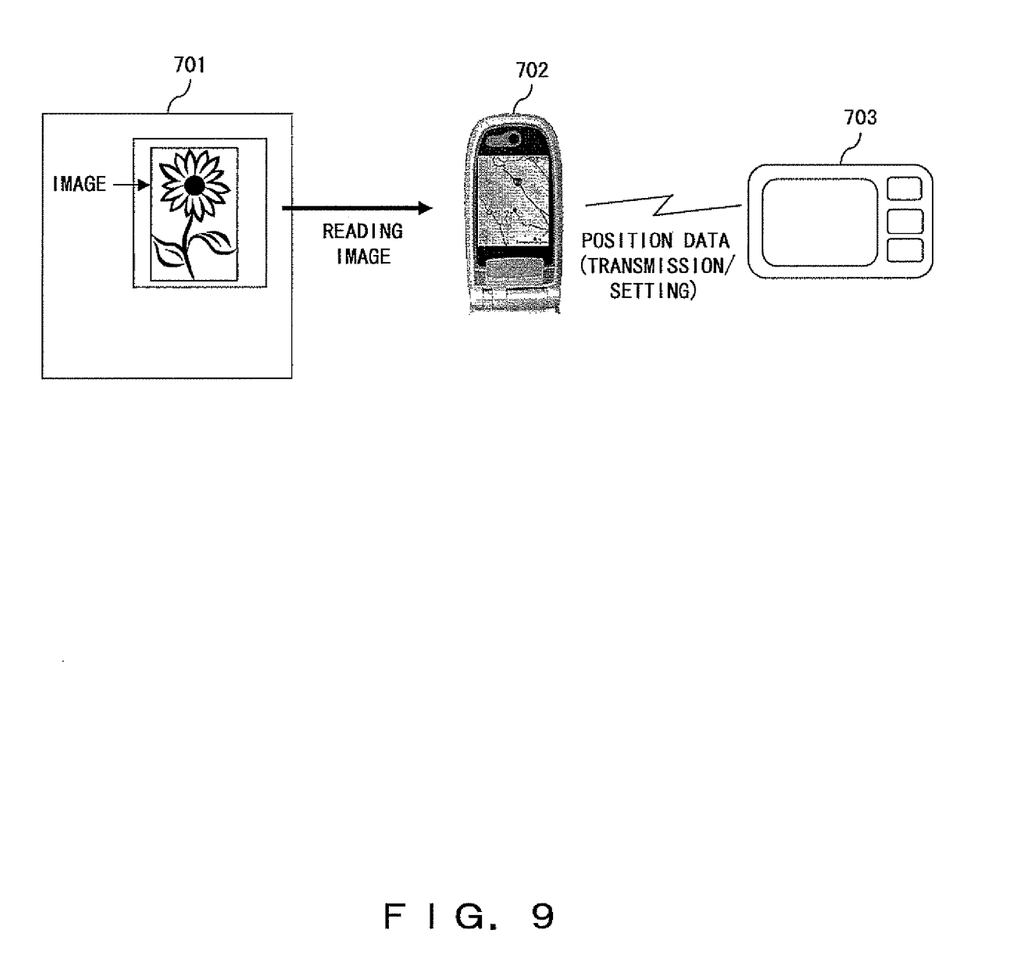
FIG. 9 shows the configuration of the data input system according to the third embodiment of the present invention.

FIG. 9 shows the configuration of the data input system according to the third embodiment of the present invention.

An image is printed to a printed matter 701, and the position data is hidden in an image as a code by the above-mentioned code hiding technique.

A data input device 702 is provided with an image input unit for capturing an image, captures the image of the printed matter 701, extracts a hidden code, and transmits the position data to the navigation device 104 if the code is position data.

A navigation device 703 sets a destination and searches a path on the basis of input position data.

Figure 10:
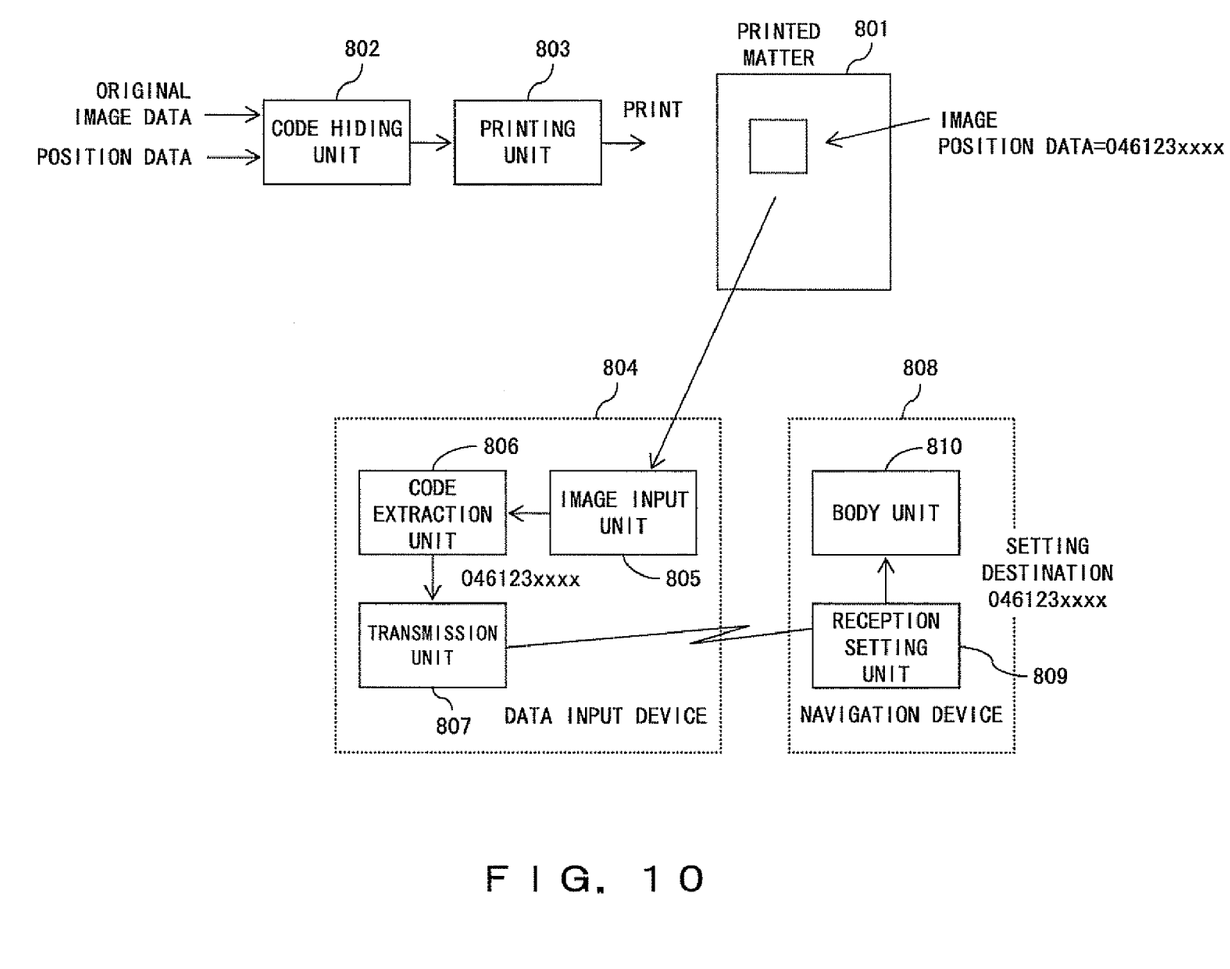
FIG. 10 is a block diagram of the data input system according to the third embodiment of the present invention.

FIG. 10 is a block diagram of the data input system according to the third embodiment of the present invention.

Figure 11:
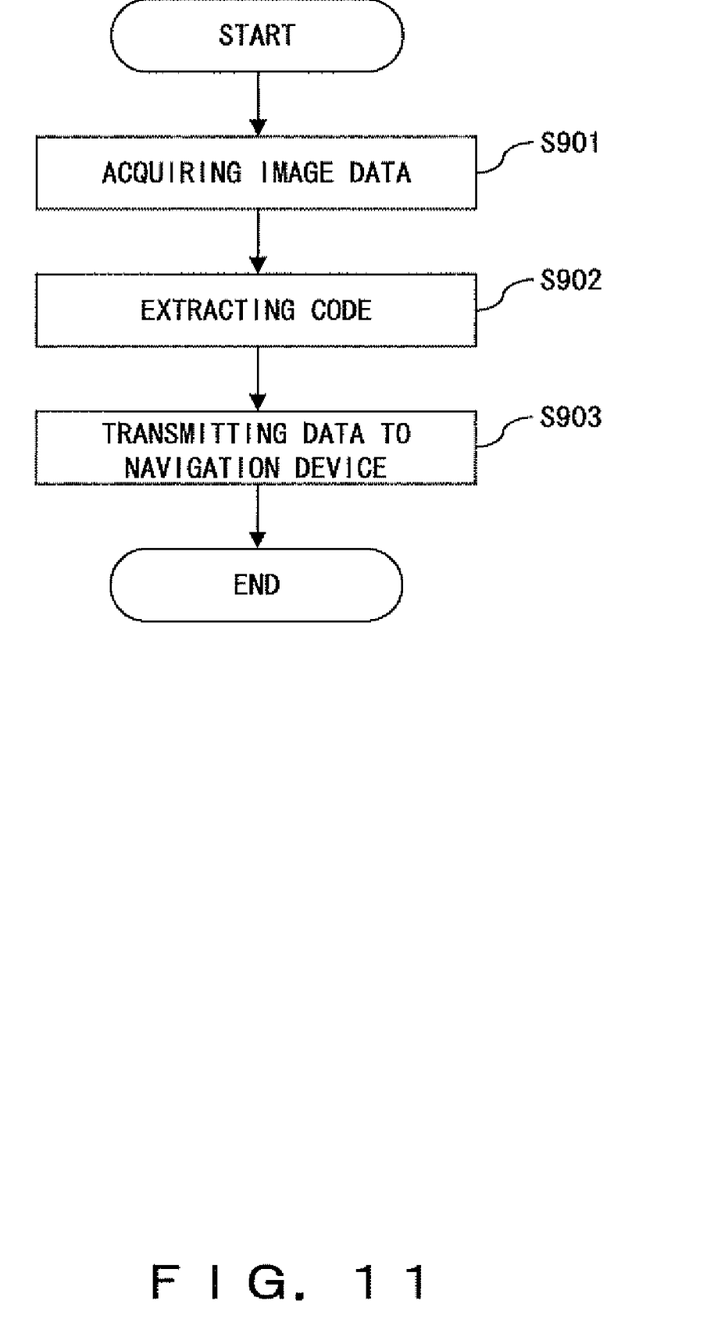
FIG. 11 is a flowchart of the process of inputting data according to the third embodiment of the present invention.

FIG. 11 is a flowchart of the process of inputting data according to the third embodiment of the present invention.

A printed matter 801 according to the third embodiment of the present invention is generated as in the first mode for embodying the present invention. Therefore, the detailed explanation is omitted here. However, the position data in place of the ID is input as a code hidden in the image to a code hiding unit 802, the image of the printed matter 801 hides the position data as a code, and the position data is 046123xxxx.

A data input device 804 is provided with an image input unit 805, a code extraction unit 806, and a transmission unit 807.

In step S901, the image input unit 805 such as a CCC camera, etc. captures an image of the printed matter 801, and stores the image data.

In step S902, the code extraction unit 806 extracts a code hidden in the stored image data, and stores it. Then, 046123xxxx is extracted as a code, and the type of the code is determined whether it is, for example, an ID, position data, etc.

In step S903, when the code is position data, the transmission unit 807 transmits the position data to a navigation device 808. Upon receipt of position data, a reception setting unit 809 of the navigation device 808 transmits the data to a body unit 810, and sets the position data as, for example, a destination.

Thus, the data input device reads an image, a code hidden in the image is extracted, the position data is transmitted to the navigation device when the code is position data, and the navigation device is set, thereby obtaining a convenient device without input errors.

Since position data is hidden in an image, it is not necessary to set an ID management server as in the first and second modes for embodying the present invention, and the required cost is lower. In addition, since the communications with the ID management server are not required, it is not necessary for the data input device to communicate with the ID management server.

What is claimed is:

1. A data input device which inputs data to a navigation device, comprising:
   an image input unit capturing an image displayed on an image display carrier for displaying an image;
   a code extraction unit extracting a code hidden in the image;
   an ID inquiry unit transmitting the extracted code to an ID management server, and receiving a position data corresponding to the code; and
   a transmission unit transmitting the received position data to the navigation device, wherein
   the data input device holds a previously transmitted code and position data corresponding to the code as history information, checks whether or not the code is stored in the history information when the extracted code is transmitted to the ID management server, transmits the position data corresponding to the code to the navigation device if the code is stored, and transmits the code to the ID management server if the code is not stored.

2. The data input device according to claim 1, wherein:
   the ID inquiry unit further receives a URL of a contents server corresponding to the code;
   a contents information read unit accessing the contents server of the URL and receiving contents information from the contents server is further comprised; and
   the transmission unit transmits the contents information to the navigation device.

3. A data input system, comprising:
   the data input device according to claim 1; and
   an ID management server storing the position data corresponding to the code, receiving the code from the transmission device of the data input device, and transmitting the position data corresponding to the code to the data input device.

4. A data input system, comprising:
   the data input device according to claim 2; and
   an ID management server storing the position data and the URL corresponding to the code, receiving the code from the transmission unit of the data input device, and transmitting the position data and the URL corresponding to the code to the data input device.

5. The data input system according to claim 4, wherein the navigation device displays the contents information on a display unit of the navigation device.

6. The data input device according to claim 1, wherein the code is hidden in an image by steganography.

7. The data input device according to claim 1, wherein the image display carrier is a printed matter.

8. A printing device for printing an image captured by the image input unit of the data input device according to claim 7, comprising:
   a code hiding unit hiding a code in an image;
   a printing unit printing an image in which the code is hidden by the code hiding device; and
   an ID management server associating and storing the hidden code and position data.

9. A printed matter printed by the printing device according to claim 8.

10. A data inputting method for a data input device, the method comprising:
    extracting a code hidden in a image from among captured images;
    transmitting the extracted code to a ID management server storing the extracted codes associated with a position data; and
    transmitting to a navigation device the position data corresponding to the extracted code received from the ID management server, wherein
    the data input device holds a previously transmitted code and position data corresponding to the code as history information
    the transmitting checks whether or not the code is stored in the history information when the extracted code is transmitted to the ID management server, transmits the position data corresponding to the code to the navigation device if the code is stored, and transmits the code to the ID management server if the code is not stored.

* * * * *